April 22, 1930.  P. DE MATTIA  1,755,981
VULCANIZING MACHINE
Filed Nov. 9, 1925   4 Sheets-Sheet 2

WITNESSES

INVENTOR
Peter De Mattia.
BY
ATTORNEYS

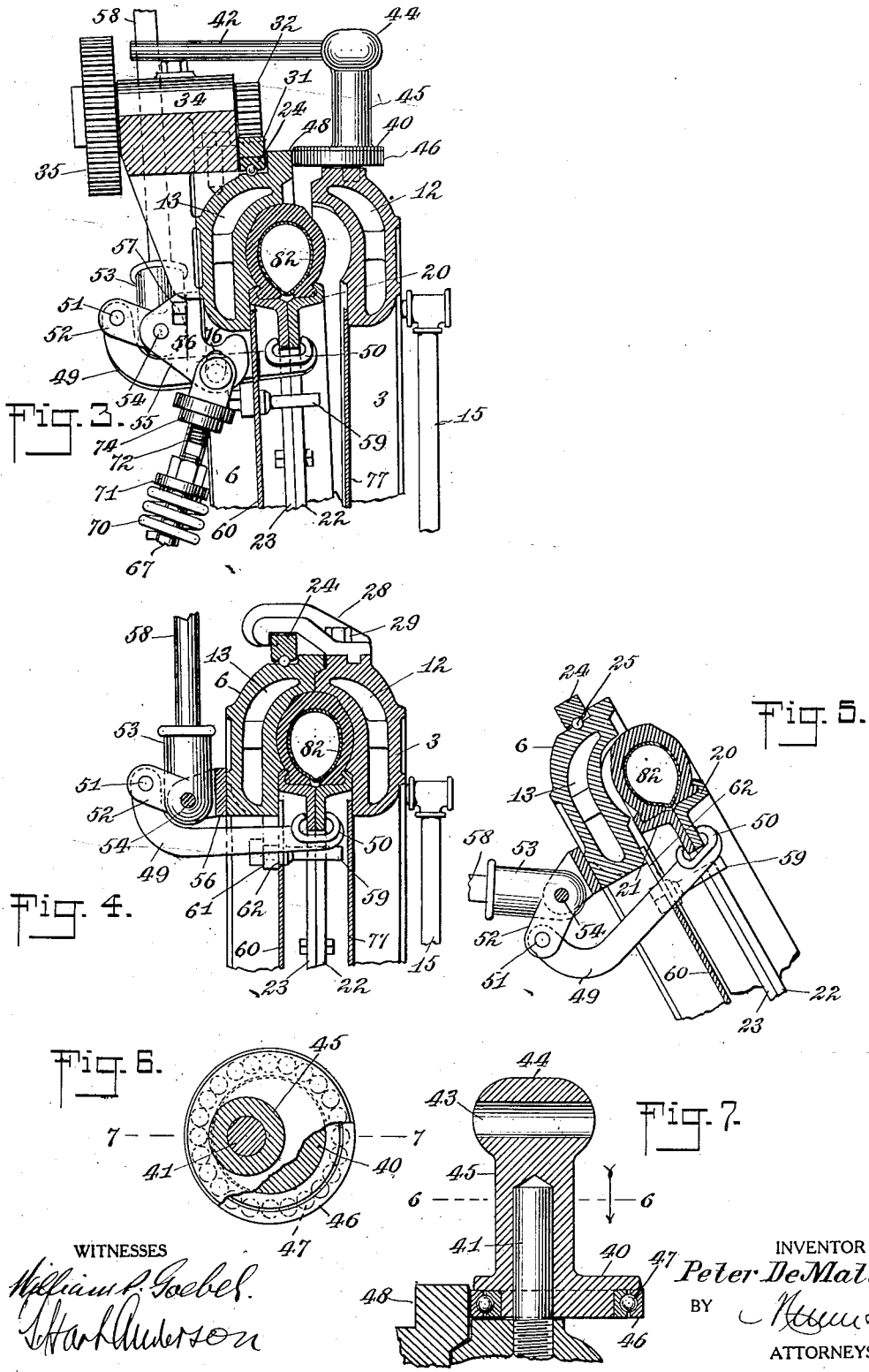

Patented Apr. 22, 1930

1,755,981

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MACHINE

Application filed November 9, 1925. Serial No. 67,968.

The present invention relates to vulcanizing molds and more particularly molds employed in vulcanizing pneumatic tires.

The object of the invention is to produce a tire vulcanizing machine of such a construction that it may be readily and quickly operated in inserting and removing a tire therefrom, thus expediting the operation of vulcanization.

Further objects are to provide a machine in which the mold members, permanently supported, have a relative movement toward and from each other to open and close the mold, and wherein the members are so supported that the relative movement which effects the closing of the mold insures the proper registration of the mold members with each other; to provide mold members each of which while comprising a single integral casting "in block", yet shall have heating chambers therein, and to provide for the introduction thereto of the heating medium, preferably steam, while at the same time permitting a relative movement of the mold members to open and close the mold; and further to provide an effective locking device and means for quickly operating it to lock the members preparatory to the vulcanizing process, against accidental displacement; to provide simple mechanism for opening and closing the mold and with means to insure the stripping of the tire from the inner face of both of the mold members and to support the same in convenient position for removal from the apparatus when the mold shall be opened after a tire has been vulcanized.

Further objects of the invention, as the same is shown in the accompanying drawings, will develop in connection with the following description of its constructive organization and mode of operation.

The invention is illustrated in the accompanying drawings in which:—

Fig. 3 shows a similar view of the upper portion with the mold partially open and showing the operation of the stripper.

Fig. 4 is a similar view with the mold closed and locked.

Fig. 5 is a fragmentary sectional view of the movable mold member, further showing the operation of the stripper.

Fig. 6 shows partly in plan and partly in horizontal section the mold breaker, the section being on the line 6—6 in Figure 7.

Fig. 7 is a fragmentary vertical sectional view of the mold breaker, the section being on the line 7—7 in Figure 6.

Similar reference characters will be employed throughout the specification and drawings to designate corresponding parts.

Figure 1:
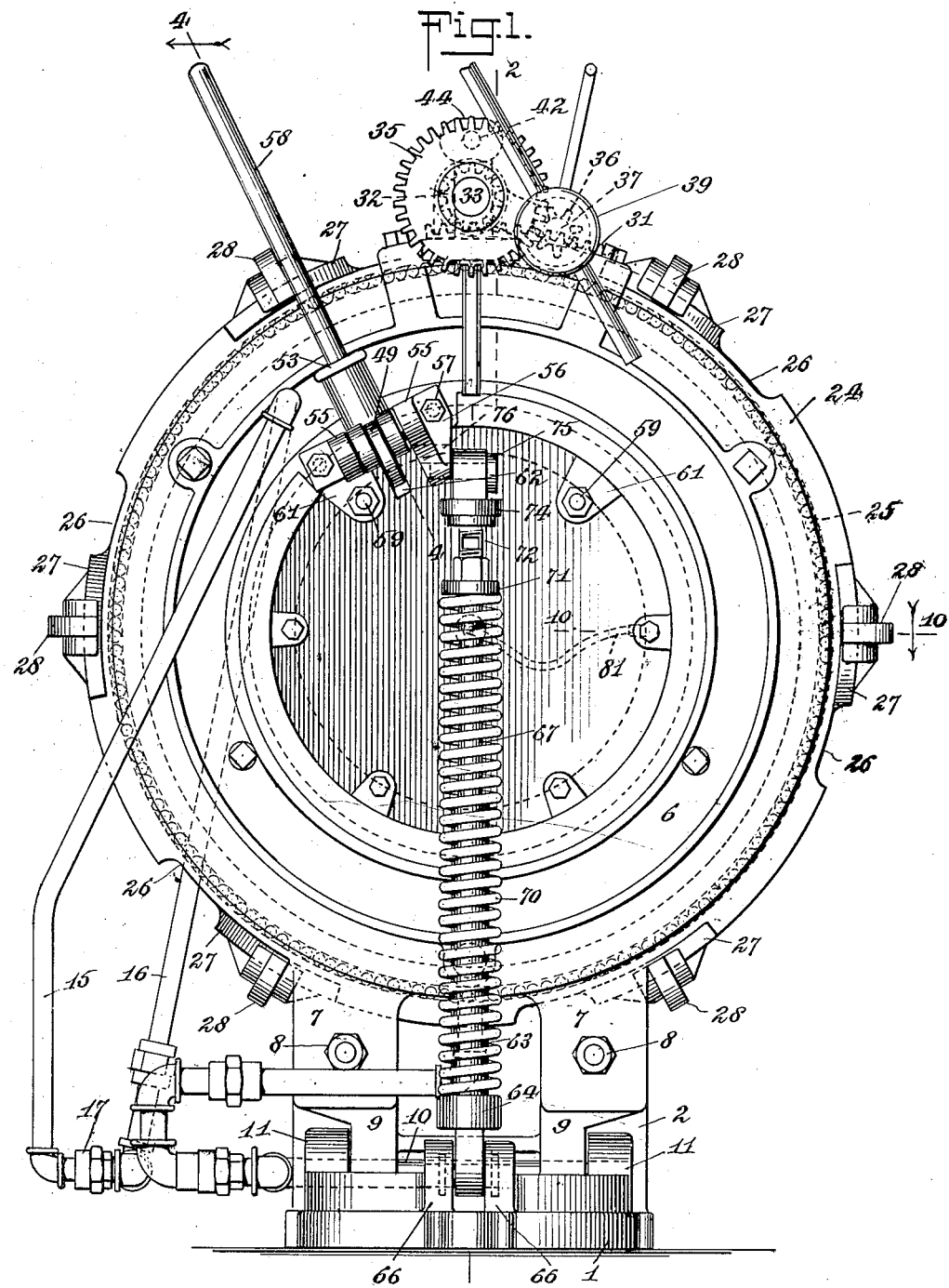
Fig. 1 shows a front elevation of my improved mold when closed.

The apparatus comprises a suitable base 1 which by means of brackets 2 supports one member 3 of the mold, preferably in a fixed vertical position and perpendicular to the base 1, the member 3 being provided with radially extending lugs 4, arranged to engage and to be fixedly secured to the brackets 2 by bolts 5.

Cooperating with the mold member 3 is a movable mold member 6 which is provided with lugs 7 connected by means of the bolts 8 to the arms or brackets 9 mounted upon a shaft 10. The shaft 10 is supported in bearings 11 supported by the base 1. This arrangement is such that the mold member 6 may have a swinging movement toward and from the mold member 3 as indicated in dotted lines in Figure 2.

The mold members are each formed of a single integral metallic casting and are of a general circular form as illustrated, and are chambered as shown at 12 and 13, to receive steam or other heating medium, preferably steam, from any suitable source of supply, there being provided suitable conductors or piping 15 and 16 whereby steam may be introduced into the chambers 12 and 13 and circulated therein as required.

In order that the movements of the mold member 6 may not interfere with the supply of steam thereto and that there shall be no leakage of steam caused by such movement, the steam conductor of this mold member will be provided with a swiveled coupling or joint as indicated at 17 in Figure 1.

Each of the mold members 3 and 6 will be provided upon its inner face with a molding and shaping surface as indicated, and beyond such molding and shaping surfaces with complementary rabbeted surfaces 18 to form a tight joint when closed. Within the molding or shaping surfaces each of the mold members is provided with the bearing surfaces 19 arranged to receive and bear against the flanges 20 and 21 of the rings 22 and 23, the said flanges 20 and 21 closing the inner periphery of the mold and providing molding surfaces to engage and shape the beaded edges of the tire, all as clearly shown and as will be understood by those familiar with this art.

Figure 8:
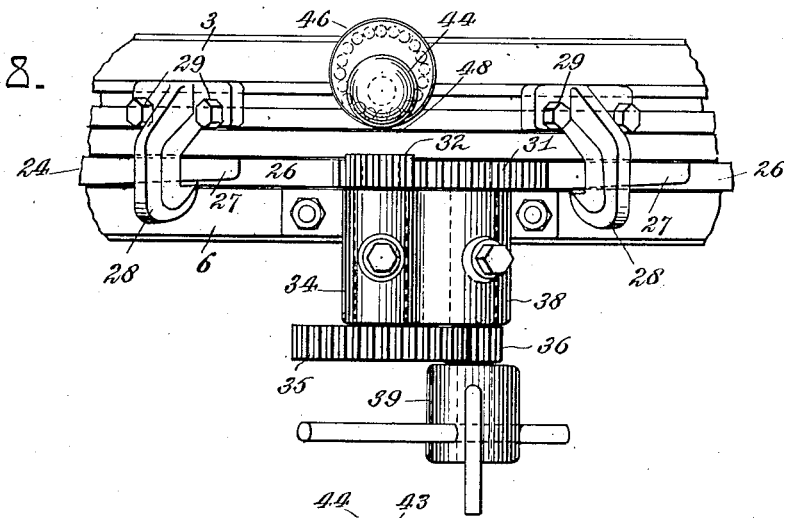
Fig. 8 is a top plan view of a portion of the device showing a portion of the locking device and the breaker.

The mold members 3 and 6 are locked together to embrace the tire and the flanges of the rings 22 and 23 during the vulcanizing process, and for this purpose I have provided a simple quickly operated locking device, designed not only to hold the mold members in closed position, but to apply thereto a clamping closing pressure. This locking device comprises a circular ring 24 carried by the movable mold member 6 and arranged to be engaged with the fixed mold member. As illustrated in the drawings the locking ring 24 is supported by a ball bearing 25 upon the outer periphery of the mold member 6 so as to be freely movable about the said member. The locking ring 24 is provided at intervals along its outer periphery with notches 26 and upon one of its side faces adjacent to the notches and connecting therewith, with the beveled surfaces 27. (See Figs. 8 and 9.) The mold member 3 is provided about its periphery with the inwardly-extending overhanging latch plates or hooks 28 held thereon by the bolts 29. These latch plates are provided on their under surface with open throats with the inner wall adjacent the outer end beveled as shown at 30, arranged to have a complementary engagement with the beveled surfaces 27 of the locking ring 24. The locking ring 24 is freely movable about the periphery of the mold member 6 and is provided at one point in its outer periphery with a rack bar 31 (see Figs. 1 and 8) arranged to be engaged by a pinion 32 carried by the inner end of a shaft 33 mounted to turn in the bearing 34 on the periphery of the mold member 6. The outer end of the shaft 33 carries a large gear 35 which is in mesh with a pinion 36 mounted at the inner end of a shaft 37 turning in the bearing 38 and provided at its outer end with means 39 whereby it may be turned and thus through the gearing turn the locking ring. The foregoing construction is such that when the locking ring is in a position so that the latches are in alignment with the notches therein, the movable mold member may be moved with relation to the fixed mold member to open and close the mold. When closed, a movement of the locking ring in one direction or the other will cause engagement or disengagement with the beveled surfaces of the latches to apply a clamping and locking pressure to the mold members or to release that pressure.

As it well known to those skilled in this art, the curing or vulcanizing of the tire causes the outer surfaces thereof to adhere to the inner surfaces of the mold members, and this adhesive connection of the tire with the mold members is sufficient to exert considerable resistance to the opening of the mold. To overcome this resistance I have provided a breaker mounted upon one of the mold members and arranged to engage the other mold member and by its movement effect a preliminary breaking or opening of the mold. This breaker comprises an eccentric 40 mounted to turn upon a post 41 projecting radially at the top of the mold member 3 and provided with a removable bar or lever 42 slidingly engaging a bearing 43 in the head 44 of a sleeve 45, by means of which the eccentric may be turned about the post 41. The eccentric 40 is provided with a movable contact ring 46 supported upon a ball bearing 47, the outer surface of which is arranged to engage a block 48 projecting from the upper edge of the movable member 6 (see Figs. 2, 3, 6 and 7). By providing a movable contact ring 46 it is obvious that the eccentric may be freely turned to any extent required after the contact ring has made contact with the block 48, without producing friction between the outer surface of the ring 46 and the surface of the block 48 with which it engages. After the locking ring has been moved so as to bring the notches 26 into register with the hook plates 28, the eccentric 40 will be turned so as to move the movable member 6 away from the fixed member 3 as indicated clearly in Figure 3, preliminary to the further movement of the movable member to the dotted line position shown in Figure 2.

Figure 9:
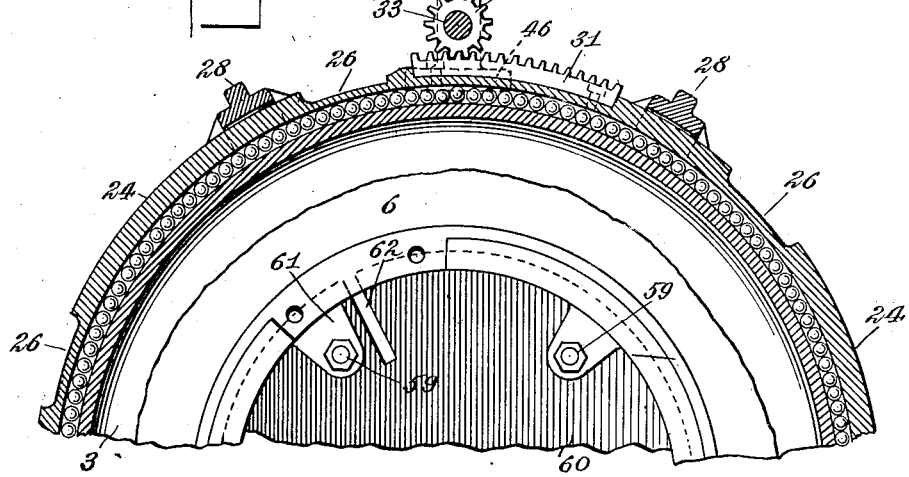
Fig. 9 is a fragmentary view in vertical section, further showing the locking device.
Figure 10:
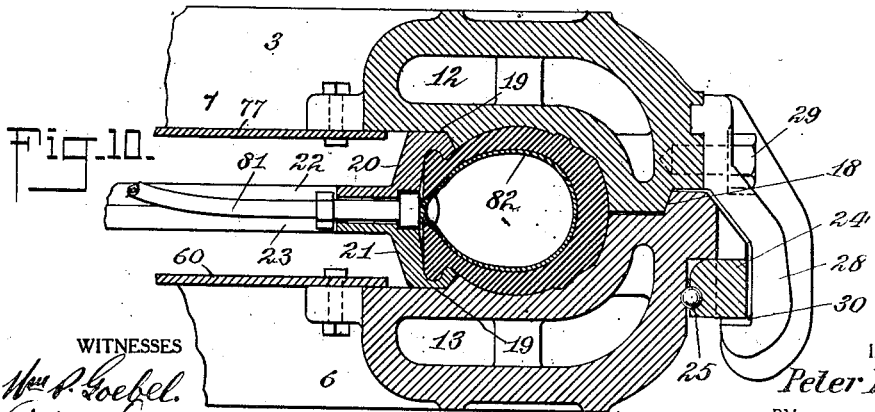
Fig. 10 is an enlarged sectional view taken on the dotted line 10 in Figure 1.

This preliminary opening movement of the mold strips the tire from the shaping surface of the mold member 3, suitable means being provided to cause the tire to partake of the movement of the mold member 6 during this preliminary opening movement of the mold. To accomplish this I have provided a stripper comprising a lever or arm 49 which at its inner end is provided with a claw 50 arranged to engage the flanges 22 and 23 of the bead rings. The lever 49 at its outer end is pivotally connected at 51 to a lever 52 which projects from and is formed as a part of a socket 53, pivoted at 54 between the ears 55 carried by a bracket 56, fixedly secured by means of bolts 57 to the outer face of the movable member 6. A suitable handle 58 projects from the socket 53 by means of which the lever 49 may be moved in and out with relation to the inner surface of the mold member 6, and may also be moved to cause the claw 50 to engage and disengage the flanges 22 and 23 of the bead rings. Prior to the preliminary breaking and opening of the mold as indicated in Figure 3, the claw 50 is engaged with the flanges of the bead rings so that it strips the tire from the molding surface of the member 3. At this point as indicated in Figure 3, a rocking of the lever 58 causes the claw 50 to force the tire away from the molding surface of the mold member 6, as clearly indicated in Figure 5, thus freeing the tire entirely from its adhesive contact with the inner surfaces of the mold members. At this point the tire and the bead rings are supported on the movable member of the mold by means of the inwardly projecting studs 59, there being two such studs projecting inwardly and positioned to engage the inner edges of the flanges 22 and 23 of the bead rings. These studs 59 are supported by a plate 60 bolted to ears 61 which plate closes the central opening of the mold member 6 and preferably the posts or studs 59 will be supported by two of the ears 61 (see Fig. 1). The plate 60 is slotted as indicated in Figures 1 and 9, as at 62, to accommodate and permit the movements of the lever 49.

Figure 2:
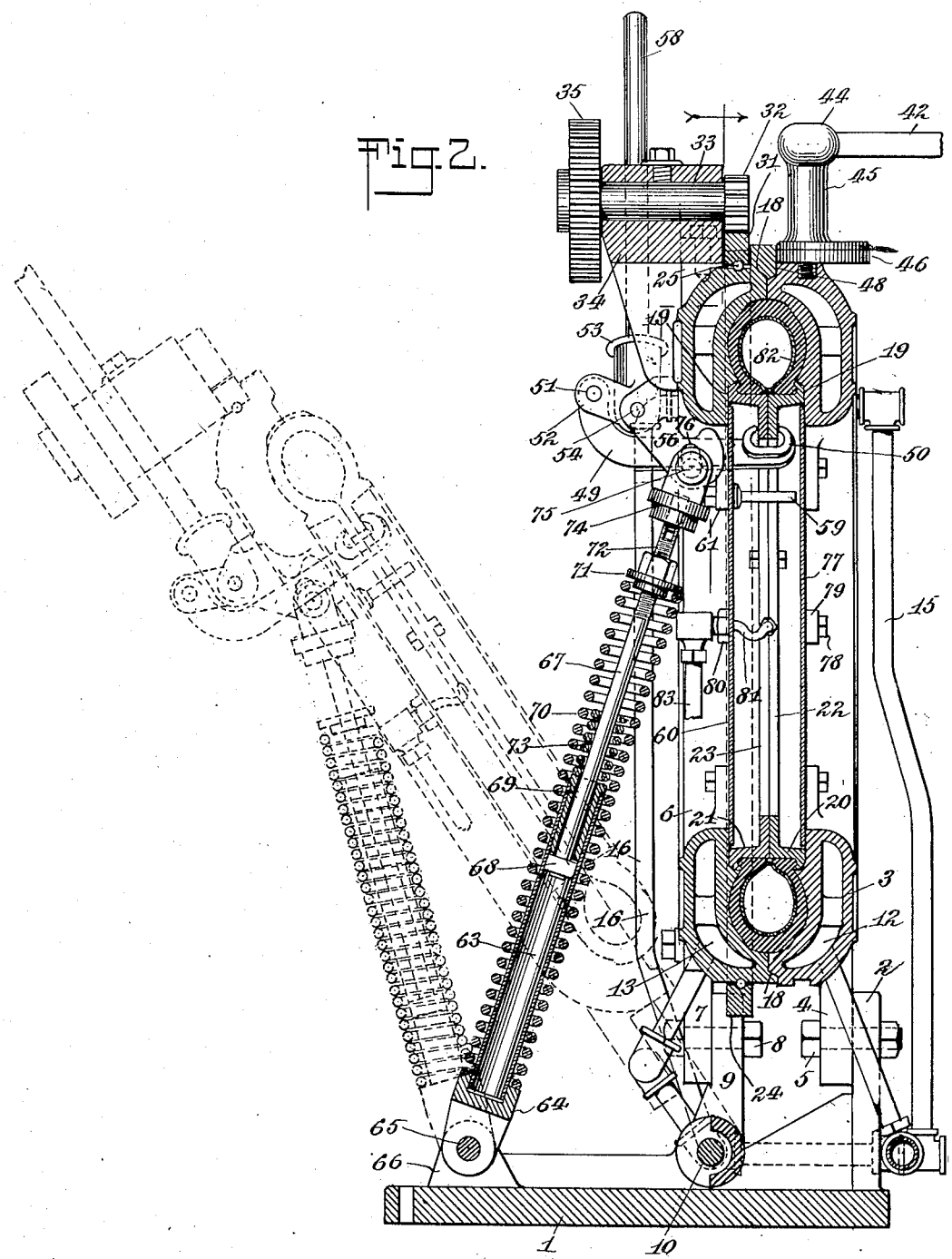
Fig. 2 shows a vertical sectional view taken on the line 2—2 in Figure 1, looking in the direction of the arrow in that figure, and showing in dotted lines the position of the movable member when the mold is open.

The tire having been stripped from the mold surfaces, the movable member 6 may now be moved to the dotted line position shown in Figure 2 at which point the tire and bead rings may be completely removed from the apparatus by lifting them from the supporting posts 59.

As the movable mold member is relatively heavy, I have provided a cushioning or counterbalancing support therefor so as to facilitate the closing and opening movement with the expenditure of little effort. This device comprises a tubular post 63 which at its lower end is supported by a rocking head 64 pivotally supported at 65 between the bearings 66, carried by a base 1. This tubular post receives a headed rod 67 arranged to slide therein and carrying at its lower end a nut 68, which is prevented from being entirely withdrawn by a sleeve 69 fitted into the upper end of the tubular post 63 and thus forming a stop to limit the extensible movement of the rod 67 in the tubular post 63. The tubular post is surrounded by a coil spring 70, the lower end being seated upon the rocking head 64 and the upper end engaging an adjustable collar 71, having a threaded engagement as at 72 with the rod 67. By this means, the compression of the spring 70 may be adjusted by the adjustable collar 71. Preferably, also, an auxiliary spring 73 is positioned about the rod 67 and supported upon the upper end of the sleeve 69 and is normally inactive when the mold is closed and the parts extended as shown in full lines in Figure 2, because its upper end is positioned at some distance below the collar 71, but as the movable member approaches the limit of its opening movement, the auxiliary spring will engage the collar 71 and strengthen the cushioning supporting resistance of the final opening movement of the mold.

At its upper end the rod 72 is provided with a head 74 pivotally engaging a stud 75 which is movably supported in a slot 76 in the bracket 56, whereby a slight play or movement is provided for the pivotal connection.

The mold member 3 is also provided with a plate 77 closing the central opening therein and held thereto by bolts 78 and the lugs or ears 79, thus when the mold is closed there is provided a central chamber between the plates 60 and 77. One of the plates also, as shown in the drawing the plate 60, is provided with a bearing 80 through which passes a flexible tube or pipe 81 which may be coupled to the air bag 82 within the tire and molds and through which a suitable fluid under pressure may be conducted to the air bag from a pipe 83 leading to any suitable source of supply.

It is thought that the mode of operation of the apparatus has been sufficiently set forth in connection with the foregoing description of the construction and organization and that such operation will be clearly understood by those familiar with the use of such an apparatus, and that a further description of the operation is not necessary.

It may be pointed out that in mounting the movable member at a pivotal point radially distant from its periphery, I not only provide for a greater clearance or operating space between the mold members when the mold is opened, but I also insure such an approach of the movable member to the fixed member as to secure proper registration of the members and tire and the complementary sealing joint, so that the closing of the mold with the tire therein is effected without any danger or liability of marring the outer surface of the tire. It is to be further noted that the telescopic construction of the pivoted counterbalancing supporting post and its cooperating coil springs, not only materially assists in the upward or closing movement of the movable member, but provides an effective cushion support when that member is moved to its maximum open position. It is of course understood that the slot in the plate 60 through which the stripper arm 40 passes while large enough to permit freedom of movement of the stripper arm 49 therethrough, yet will prevent any up and down movement of the stripper arm so that the claw at the inner end thereof will be held in proper position to engage the flanges of the bead supporting rings as shown in the drawing.

Having described my invention, I claim:

1. In a vulcanizing machine, in combination, a pair of mold members and a breaker comprising a movable eccentric carried by one of said members and engaging the other member and a movable contact ring carried by said eccentric for directly engaging the other member.

2. In a vulcanizing machine, in combination, a pair of mold members, a breaker carried by one of said members, said breaker comprising a revolvable eccentric, a movable contact ring carried by said eccentric, an antifriction ball bearing supporting said contact ring, said contact ring adapted to engage directly the other member of the mold and means to turn said eccentric.

3. In a vulcanizing machine, in combination, a pair of vertically disposed cooperating mold members, one of said members being pivotally mounted at its lower part for movement toward and from the other member and a counterbalancing yielding support pivotally connected to the outer side of said movable member, and pivotally supported at its opposite end forwardly of the pivotal mounting of said movable member.

4. In a vulcanizing machine, in combination, a pair of vertically disposed cooperating mold members, one of said members being pivotally mounted at its lower part for movement toward and from the other member and a counterbalancing yielding support pivotally mounted at its lower end forwardly of the pivotal mounting of said movable member and pivotally connected to the outer side of said movable member at a point above the pivotal support of said member.

5. In a vulcanizing machine, in combination, a pair of vertically disposed cooperating mold members, one of said members being pivotally mounted at its lower part for movement toward and from the other member, a counterbalancing yielding support for said member comprising a telescopic rod and a coil spring surrounding said rod and resisting the telescopic action thereof in one direction, said support being pivotally connected at its upper end to the outer side of said movable member and at its lower end to a fixed support forwardly of the pivotal mounting of said movable member.

6. In a vulcanizing machine, in combination, a pair of vertically disposed cooperating mold members, one of said members being pivotally supported at its lower part for movement toward and from the other member, a counterbalancing yielding support pivotally connected at its upper end to the outer side of said movable member and at its lower end to a fixed support forwardly of the pivotal mounting of said movable member, and means to adjust the tension of said counterbalancing support.

7. In a vulcanizing machine, in combination, a pair of vertically disposed cooperating mold members, one of said members being pivotally supported at its lower part for movement toward and from the other member and a counterbalancing yielding support for the movable member connected to and arranged on the outside thereof and comprising a tubular post, a headed rod mounted therein for sliding movement, a coil spring engaging said tubular post and rod and an auxiliary coil spring surrounding the rod and seated at one end upon the tubular post.

8. In a vulcanizing machine, in combination, a pair of vertically disposed cooperating mold members, one of said members being pivotally supported at its lower part for movement toward and from the other member, a counterbalancing support for said movable member connected to and arranged on the outside thereof, said support comprising a telescopic post, a coil spring surrounding the post and a stop for limiting the extensible movement of said telescopic post.

9. In a tire vulcanizing machine, in combination, a pair of mold members, one of said members being mounted for movement toward and from the other member, a stripping device comprising a lever having at its inner end a claw carried by the movable member and independently operable means to operate the stripping device to strip the tire first from the fixed member and thereafter from the movable member.

10. In a tire vulcanizing machine, in combination, a pair of mold members, one of said members being movable with relation to the other, plates closing the central openings of said mold members, flanged bead rings cooperating with said mold members within the chamber formed by said plates, and a stripping device projecting within said chamber and having a claw to engage the flanges of said rings and an independently operating device located outside of said chamber to operate the stripping device.

11. In a tire vulcanizing machine, in combination, a pair of mold members, one of said members being movable with relation to the other member, a pair of bead supporting rings cooperating therewith, a stripper carried by the movable member independently operable means to operate said stripper, and supporting devices carried by the movable member arranged to engage the bead rings to support said rings and tire on the movable member after the operation of the stripper.

12. In a vulcanizing machine, a pair of vertically disposed mold members, a horizontal pivotal mounting for supporting one of said members independently adjacent its lower periphery for a swinging movement towards and from the other member, a radial post carried by the fixed member at its upper periphery, an eccentric mounted to turn about said post, a movable ring surrounding said eccentric, an anti-friction ball bearing between said ring and eccentric and a block carried by the movable member to be directly engaged by said bearing ring when the eccentric is turned about the said post.

13. In a vulcanizing machine, a pair of annular vulcanizing fixed molds, one of said molds being fixedly mounted and the other pivotally mounted for movement towards and from the fixed mold, plates closing the central openings of said molds and forming a closed chamber when the molds are closed, bead-supporting rings fitting between said mold members when closed with their radial flanges in contact with each other and located within said closed chamber, a reciprocating arm having a claw at its inner end passing through one of the plates with the claw engaging the radial flanges of the bead rings, said arm at its outer end pivotally connected to a bell crank lever whereby to reciprocate said arm.

14. A vulcanizing machine including, in combination, a pair of vertically disposed independently supported cooperating mold members, one of said members being independently pivotally mounted at its lower part to move toward and from the other member, a counterbalancing yielding support for the said movable member connected to and arranged at the outside thereof, a locking device to lock said members when in closed position, a breaker comprising a movable eccentric carried by the stationary member and arranged to engage directly the movable member, a stripping device comprising a lever having on its inner end a claw and carried by the movable member, and independent means to operate said stripping device.

15. A vulcanizing machine including, in combination, a pair of vertically disposed independently supported cooperating mold members, one of said members being independently pivotally mounted at its lower part to move toward and from the other member, a counterbalancing yielding support pivotally connected at one end to said movable member and pivotally connected at its other end forward of said movable member, an annular movable locking ring surrounding the periphery of and carried by said movable mold member and provided with peripheral notches at intervals, engaging hooks carried by the other member to cause the notches therein to register in and to be disposed with relation to said engaging hooks, a breaker comprising a movable eccentric carried by the stationary member and arranged to engage directly the movable member, a stripping device comprising a lever having at its inner end a claw and carried by the movable member, and independent means to operate said stripping device.

PETER DE MATTIA.